(No Model.)
3 Sheets—Sheet 1.

W. A. WOOD.
HARVESTER RAKE.

No. 265,728. Patented Oct. 10, 1882.

(No Model.)  W. A. WOOD.  3 Sheets—Sheet 3

HARVESTER RAKE.

No. 265,728.  Patented Oct. 10, 1882.

WITNESSES
F. L. Ourand
R. M. Smith.

INVENTOR
Wm Anson Wood
by Sell. Smith
Attorney

UNITED STATES PATENT OFFICE.

WILLIAM ANSON WOOD, OF YOUNGSTOWN, OHIO, ASSIGNOR TO FRANK WOOD, OF SAME PLACE.

HARVESTER-RAKE.

SPECIFICATION forming part of Letters Patent No. 265,723, dated October 10, 1882.

Application filed March 20, 1882. (No model.)

*To all whom it may concern:*

Be it known that I, WM. ANSON WOOD, of Youngstown, county of Mahoning, State of Ohio, have invented new and useful Improvements in Harvester-Rakes, of which the following is a full, clear, and exact description, reference being had to the accompanying drawings, making part of this specification, in which—

Figure 1:
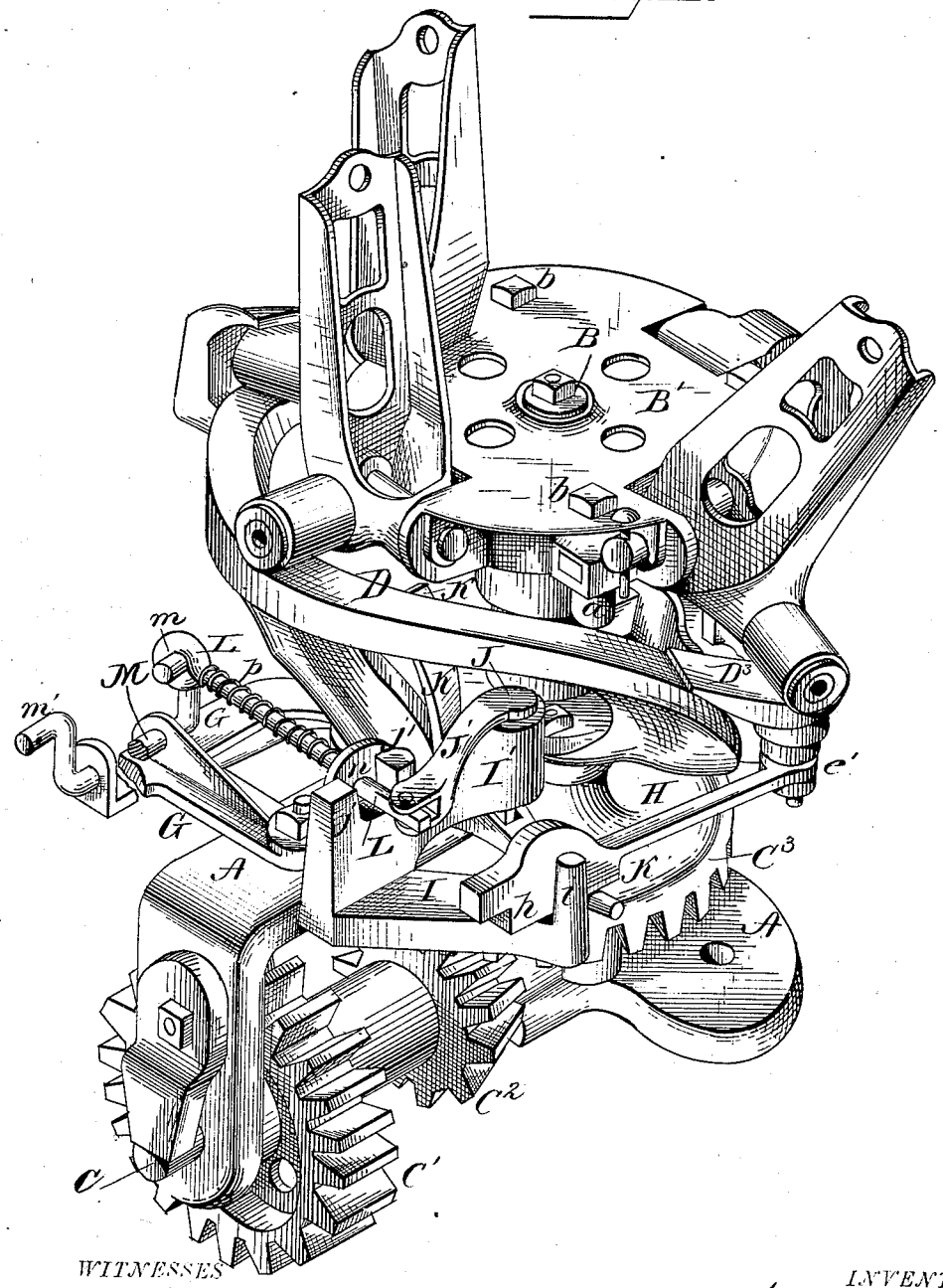
Figure 2:
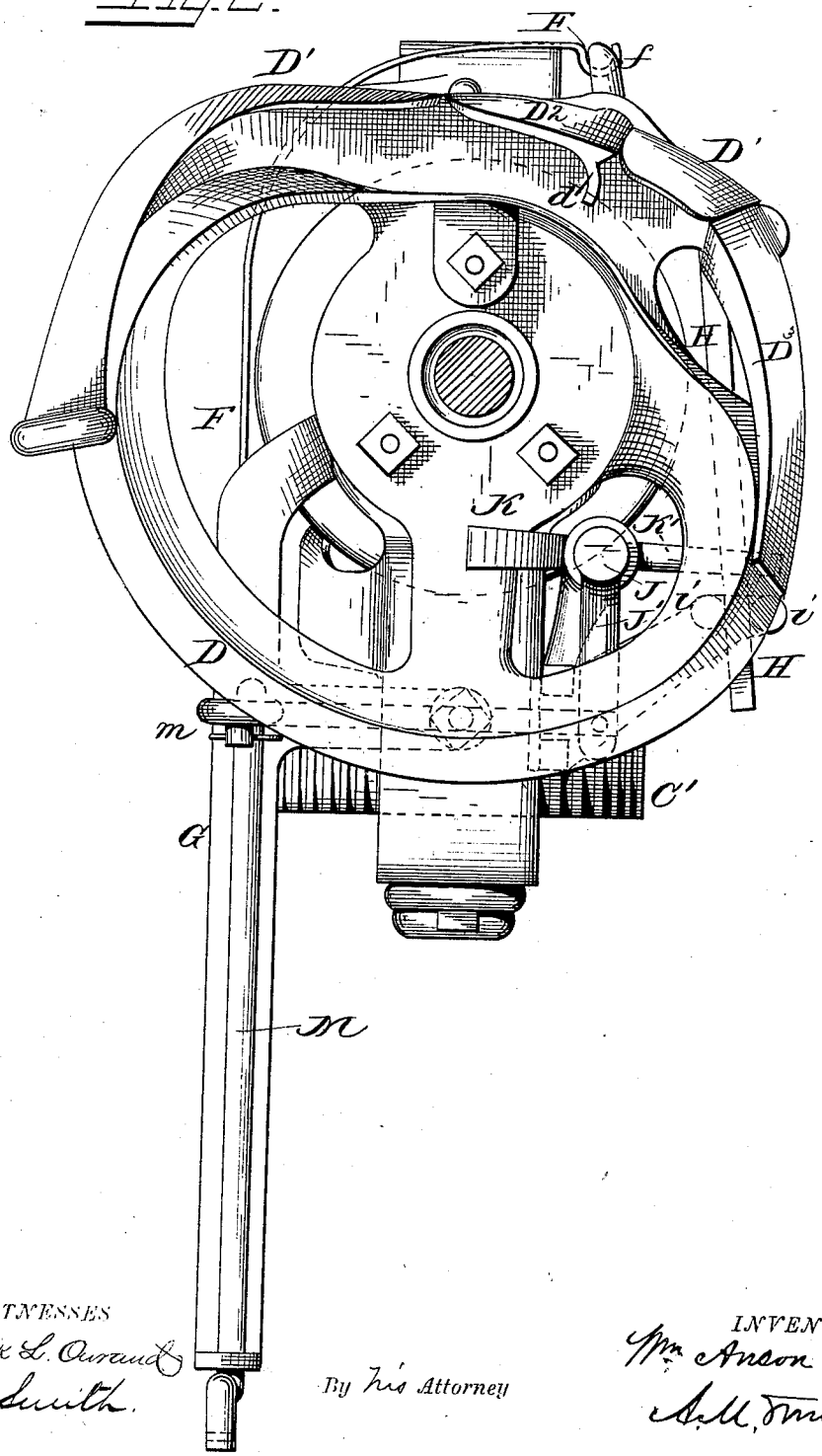
Figure 3:
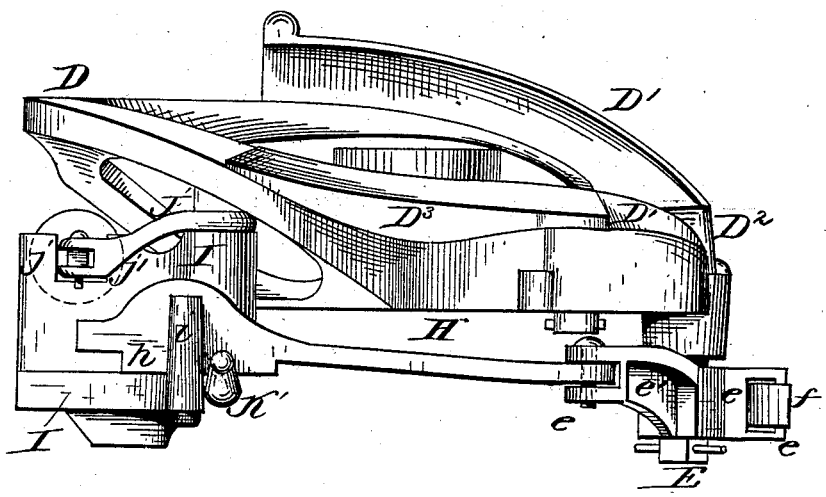

Figure 1 is a perspective view of a harvester-rake stand, cam, and head, with the attached actuating-gear and rake and reel arms. Fig. 2 is a plan view of the rake cam and stand with the rake-head removed, and Fig. 3 is a rear elevation of the cam and the switch lock or latch.

My invention relates to a novel arrangement of spring and latch in connection with the cam-switch controlling the path of the rake and reel arms, and of the tripping devices operating in connection with said latch, whereby the switch is automatically controlled for regulating the frequency of discharge of the gavels, while at the same time it is placed under the control of the attendant for preventing the discharge of the gavels, when desired, as hereinafter explained.

In the accompanying drawings, A represents a rake stand or yoke of a form adapting it to be secured to the inner shoe or to the finger-bar, platform, or frame, in near proximity thereto, and provided with bearings for an upright shaft, B, carrying the rake-head B', and for a short horizontal shaft, C, upon which is mounted a gear, C', to which motion is imparted from any suitable gearing on the harvester, said gear being connected by a sleeve with a bevel-wheel, C², through which motion is imparted to a bevel-wheel, C³, on the rake-shaft B, for actuating the latter.

D is the annular rake-cam, similar in form to such as are now in use, and rigidly secured by bolts, or in any other suitable manner, to the stand A. A portion of the cam or cam-track is made double-walled or grooved, and a switch or gate at D² is formed in the outer wall, D', of the groove, by the adjustment of which the path of the rake and reel arms may be changed from one in which the heads are caused to act as rakes to one in which they act as reel or gathering arms only, or vice versa, as required, and at D³ said outer wall is provided with a terminal pivoted portion adapted to rise to permit the rake-roller to pass out of the groove and to bridge the end of said groove for the support of the rake-roller in the return of said roller to the main part D of the cam after it has passed out of the groove through the switch-opening therein. The switch D² is provided with an angular heel-extension, $d$, which, when the switch is in position, closing the opening in the outer wall of the cam-groove, projects across or partly across the groove in the path of the roller, passing through the same, as shown in Fig. 2. The switch D² is formed upon or secured to an upright pivot, E, journaled in the bottom wall of the cam-groove, or in a lateral extension or ear formed thereon, and is provided on its lower end with a bell-crank or arms, $e$ and $e'$, one of which, $e$, is slotted at its end or otherwise adapted to receive and retain a hook, $f$, on one end of a flat bent spring, F, which at its opposite end is rigidly secured to an arm or bracket, G, or other suitable support on the stand A. The tension of the spring F is exerted upon the switch D² to close the opening in the outer wall, D', of the groove for causing the rake-rollers to remain in said groove. The arm $e'$ of the switch-pivot E has one end of a latch or latch-rod, H, pivoted to it, said rod being provided at its opposite end with a shoulder or rabbet, $h$, on its lower face, adapting it, when the arm $e'$ is drawn outward, by the action of a rake-roller on the heel-extension $d$ of the switch, to drop into engagement with a bracket, I, formed on or secured to the rake-stand. The end $h$ of the latch plays between upright guiding-pins $i$ $i$ on the bracket I, and is weighted to insure its dropping into engagement with said bracket when drawn out by the movement of the arm $e'$. By this arrangement one of the rake-rollers, passing through the cam-groove and acting upon the heel-extension of the switch D², causes the latch H to be drawn out until it drops into engagement with the bracket I, in which it holds the switch in position crossing the cam-groove, causing the succeeding rake-rollers to pass out of said groove and to lift the rakes out of the grain on the platform. For tripping the latch H and releasing the switch the rake-head B is provided with a perforation, b, just in advance of each rake-arm socket, for the insertion of a pendent pin, or of a pendent bracket provided with a pin, a, armed, if desired, with a friction-roller for facilitating its action.

The bracket I has an inwardly-projecting arm, I', formed upon it, provided on its inner end with a vertical eye or sleeve, forming a bearing for a rock-shaft, J, to the lower end of which an angular or bell-crank lever, K, is connected by a horizontal pivot, the horizontal arm K' of said lever extending underneath the latch H, and the upwardly-projecting arm extending up within the path of the pin or roller a, which, by vibrating the lever K on its pivot, causes the arm K' to lift the latch H, releasing it from the bracket I, and permitting the switch D² to swing outward under the tension of the spring F, closing the opening in the outer wall of the cam-groove and permitting the rake-roller again to follow said groove.

The upper end of the vertical rock-shaft J has an inwardly-projecting crank-arm, J', formed upon or attached to it, said arm at its inner end having a rod, L, pivoted to it, which extends forward between the steadying-pins j j' on the bracket I, and has its forward end connected with an upright crank-arm, m, on a transverse rock-shaft, M, mounted in suitable bearings on the bracket G.

The rod L has a washer, n, mounted loosely upon it in front of the pins j j', and between said washer and the crank m a spiral spring, p, surrounds the rod, its tension being exerted to force the arm m away from the pins j j', and thus to draw the arm J' forward in position for holding the latch-lever K in the path of the pendent pin or roller a, for causing it to be operated thereby.

The outer end of the rock-shaft M is provided with a crank-arm, m', through which connection is made by a rod with a treadle arranged within convenient reach of the foot of the driver in his seat on the machine, the arrangement of said rod and treadle-lever being by preference similar to that shown in Letters Patent granted to me January 3, 1882. By pressing upon the treadle referred to the driver, through the connections described, can rock the vertical shaft J, and with it the tripping-lever, moving the arm K thereof out of the path of the pins a, and thus preventing the latter from acting upon the lever and the latch H, thereby preventing the release of the switch and causing the arms to act as reel or gathering arms only.

Any desired number or all of the arms may be set to act as rake-arms, according to the condition of the grain, or whether it is desired to discharge the grain in gavels of suitable size for binding or in a continuous swath, and when so set they may, at the option of the driver, be made to act as beater or gathering arms only where the grain is thin and it is desired to let more accumulate on the platform before discharging, in turning corners, or for any other purpose where such an action is desirable.

The rake-arms are similar to those in common use, pivoted in sockets in the revolving head B, and provided with angular heel-extensions carrying the rake-rollers working over the cam and in the cam-groove, and the rakes or rake-stales secured thereto, together with other parts of the rake and machine not particularly described, may be constructed and arranged in any usual or preferred way.

Having now described my invention, I claim—

1. The adjustable tripping-lever connected by a horizontal pivot with a vertical rock-shaft, in combination with the rake cam-switch and its latch, arranged and operating substantially as described.

2. A tripping-lever for releasing the cam-switch latch, pivoted to a rock-shaft, in combination with mechanism for rocking said lever out of the path of the tripping devices, adapting it to be controlled by the driver in his seat on the machine, substantially as described.

In testimony whereof I have hereunto set my hand this 15th day of March, A. D. 1882.

WILLIAM ANSON WOOD.

Witnesses:
 FREDERICK P. FISH,
 ANNIE J. LOCKE.